(12) United States Patent
Matthews et al.

(10) Patent No.: US 11,607,749 B2
(45) Date of Patent: Mar. 21, 2023

(54) METHOD AND ARRANGEMENT FOR THE LIQUID-ASSISTED LASER TEXTURING OF MOVING STEEL STRIP

(71) Applicant: TATA STEEL NEDERLAND TECHNOLOGY B.V., Velsen-Noord (NL)

(72) Inventors: David Thomas Allan Matthews, Borne (NL); Hasib Mustafa, Enschede (NL); Rob Hagmeijer, Enschede (NL); Gerardus Richardus Bernardus Engelina Römer, 's-Heerenberg (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 589 days.

(21) Appl. No.: 16/325,205

(22) PCT Filed: Jul. 4, 2017

(86) PCT No.: PCT/EP2017/066558
§ 371 (c)(1),
(2) Date: Feb. 13, 2019

(87) PCT Pub. No.: WO2018/054569
PCT Pub. Date: Mar. 29, 2018

(65) Prior Publication Data
US 2019/0202004 A1    Jul. 4, 2019

(30) Foreign Application Priority Data

Sep. 23, 2016  (EP) .................................... 16190467

(51) Int. Cl.
*B23K 26/352*    (2014.01)
*B23K 26/00*     (2014.01)
(Continued)

(52) U.S. Cl.
CPC ............ *B23K 26/355* (2018.08); *B21B 1/227* (2013.01); *B21B 37/46* (2013.01);
(Continued)

(58) Field of Classification Search
CPC .............. B23K 26/355; B23K 26/0624; B23K 26/1224; B23K 26/352; B23K 26/361;
(Continued)

(56) References Cited

U.S. PATENT DOCUMENTS 3,850,698 A * 11/1974 Mallozzi ............... C21D 10/005
                                                              148/525
4,115,683 A *  9/1978 Clark .................... B23K 26/382
                                                             219/121.84
(Continued)

FOREIGN PATENT DOCUMENTS

CN        1572015 A      1/2005
CN      103249504 A  *   8/2013  ............. B05B 1/046
(Continued)

OTHER PUBLICATIONS

International Search Report and Written Opinion dated Sep. 11, 2017 for PCT/EP2017/066558 to Tata Steel Nederland Technology B.V. filed Jul. 4, 2017.

*Primary Examiner* — Jimmy Chou
(74) *Attorney, Agent, or Firm* — Vorys, Sater, Seymour and Pease LLP

(57) ABSTRACT

A method and arrangement for the texturing of a moving steel strip wherein a texture is applied to a surface of a moving steel strip by ablation by means of a single laser beam or a plurality of laser beams directed at the surface of the moving steel strip and wherein a liquid is supplied on the moving steel strip over a surface area on the moving steel strip that covers the working area of the single laser beam or the plurality of laser beams on the moving steel strip.

20 Claims, 3 Drawing Sheets

(51) Int. Cl.
*B23K 26/08* (2014.01)
*B23K 26/16* (2006.01)
*B23K 26/12* (2014.01)
*B23K 26/361* (2014.01)
*B23K 26/0622* (2014.01)
*B21B 1/22* (2006.01)
*B21B 37/46* (2006.01)
*B23K 101/16* (2006.01)
*B23K 103/04* (2006.01)

(52) U.S. Cl.
CPC ...... *B23K 26/0006* (2013.01); *B23K 26/0624* (2015.10); *B23K 26/0846* (2013.01); *B23K 26/1224* (2015.10); *B23K 26/16* (2013.01); *B23K 26/352* (2015.10); *B23K 26/361* (2015.10); *B23K 2101/16* (2018.08); *B23K 2103/04* (2018.08)

(58) Field of Classification Search
CPC ............ B23K 26/0006; B23K 26/0846; B23K 26/16; B23K 2103/04; B23K 2101/16; B21B 1/227; B21B 37/46
USPC ............. 219/121.69, 121.73, 121.84, 121.85
See application file for complete search history.

(56) References Cited

U.S. PATENT DOCUMENTS

| | | | | |
|---|---|---|---|---|
| 4,251,709 A | * | 2/1981 | Schumacher | B23K 31/02 219/121.64 |
| 4,401,477 A | * | 8/1983 | Clauer | C21D 10/005 219/121.6 |
| 4,426,867 A | * | 1/1984 | Neal | C23C 24/04 29/889.7 |
| 4,694,672 A | * | 9/1987 | Baughman | B24C 3/08 451/38 |
| 4,937,421 A | * | 6/1990 | Ortiz, Jr. | B23K 26/18 219/121.68 |
| 5,674,329 A | * | 10/1997 | Mannava | C21D 10/005 148/903 |
| 5,744,781 A | * | 4/1998 | Yeaton | B23K 26/146 219/121.84 |
| 5,756,965 A | * | 5/1998 | Mannava | B23P 6/002 219/121.84 |
| 5,790,620 A | | 8/1998 | Okazaki et al. | |
| 5,948,293 A | * | 9/1999 | Somers | B23K 26/356 73/11.02 |
| 6,049,058 A | * | 4/2000 | Dulaney | B23K 26/1224 219/121.84 |
| 6,084,202 A | * | 7/2000 | Okazaki | B23K 26/0821 219/121.84 |
| 6,130,400 A | * | 10/2000 | Rockstroh | B23K 26/03 148/903 |
| 6,159,619 A | * | 12/2000 | Rockstroh | C21D 10/005 148/903 |
| 6,281,473 B1 | * | 8/2001 | Wright, III | C21D 10/005 219/121.84 |
| 6,333,488 B1 | * | 12/2001 | Lawrence | C21D 10/005 219/121.84 |
| 6,410,884 B1 | * | 6/2002 | Hackel | B21D 26/00 219/121.61 |
| 6,558,485 B2 | * | 5/2003 | Moreman, III | C23C 26/00 219/121.61 |
| 6,657,160 B2 | * | 12/2003 | Hackel | B23K 26/0732 219/121.85 |
| 6,852,179 B1 | * | 2/2005 | Toller | C21D 10/005 219/121.72 |
| 6,923,877 B1 | * | 8/2005 | Anderson | C21D 10/005 427/457 |
| 7,148,448 B2 | * | 12/2006 | Warren, Jr. | B23K 26/03 219/121.84 |
| 7,304,266 B2 | * | 12/2007 | Mannava | C21D 10/005 219/121.84 |
| 7,728,258 B2 | * | 6/2010 | Richerzhagen | B23K 26/146 219/121.84 |
| 7,868,268 B1 | * | 1/2011 | Tenaglia | B23K 26/18 148/508 |
| 8,304,686 B2 | * | 11/2012 | Sano | B23K 26/00 219/121.61 |
| 8,319,150 B2 | * | 11/2012 | Lawrence | C21D 10/005 219/121.81 |
| 10,196,706 B2 | * | 2/2019 | Glaser | B23K 26/356 |
| 10,876,185 B2 | * | 12/2020 | Zhang | B23K 26/356 |
| 2004/0197433 A1 | | 10/2004 | Terada et al. | |
| 2005/0040149 A1 | * | 2/2005 | Rockstroh | B23K 26/146 219/121.73 |
| 2005/0092724 A1 | * | 5/2005 | Warren | B23K 26/032 219/121.85 |
| 2006/0006158 A1 | * | 1/2006 | Lawrence | B23K 26/08 219/121.85 |
| 2006/0054607 A1 | * | 3/2006 | Wu | B23K 26/00 219/121.85 |
| 2007/0119824 A1 | * | 5/2007 | Deaton | G01N 29/12 219/121.85 |
| 2007/0262063 A1 | * | 11/2007 | Sano | B23K 26/356 219/121.85 |
| 2008/0067159 A1 | * | 3/2008 | Zhang | B23K 26/389 219/121.84 |
| 2008/0185367 A1 | * | 8/2008 | El-Hanany | B23K 26/40 219/121.84 |
| 2010/0258542 A1 | * | 10/2010 | Meyer | E06B 7/08 219/121.69 |
| 2012/0074105 A1 | * | 3/2012 | Okamoto | B23K 26/146 219/121.72 |
| 2013/0020297 A1 | * | 1/2013 | Gupta | B23K 26/1224 219/121.72 |
| 2013/0052479 A1 | * | 2/2013 | Seetharaman | B23K 26/356 219/121.85 |
| 2013/0206739 A1 | * | 8/2013 | Reed | F23R 3/002 219/121.71 |
| 2014/0154871 A1 | * | 6/2014 | Hwang | B23K 26/146 219/121.67 |
| 2014/0312009 A1 | * | 10/2014 | Okabe | C22C 38/001 219/121.29 |
| 2015/0090771 A1 | * | 4/2015 | Furfari | B23K 26/356 219/121.64 |
| 2016/0083815 A1 | * | 3/2016 | Glaser | C21D 10/005 72/56 |
| 2016/0158886 A1 | * | 6/2016 | Kumar | B23K 26/40 219/121.61 |
| 2016/0199945 A1 | * | 7/2016 | McDowell | B23K 26/03 219/121.7 |
| 2017/0239751 A1 | * | 8/2017 | Luo | B23K 26/073 |

FOREIGN PATENT DOCUMENTS

| | | | | |
|---|---|---|---|---|
| EP | 0792756 A2 | * | 2/1997 | ........... B41M 5/267 |
| EP | 2463068 A1 | | 6/2012 | |
| JP | 2012125788 A | * | 7/2012 | |
| JP | 2012125788 A | | 7/2012 | |
| WO | 2008119949 A1 | | 10/2008 | |

* cited by examiner

METHOD AND ARRANGEMENT FOR THE LIQUID-ASSISTED LASER TEXTURING OF MOVING STEEL STRIP

CROSS-REFERENCE TO RELATED APPLICATIONS

This is a § 371 National Stage Application of International Application No. PCT/EP2017/066558 filed on Jul. 4, 2017, claiming the priority of European Patent Application No. 16190467.7 filed on Sep. 23, 2016.

FIELD OF THE INVENTION

The invention relates to a method of laser texturing of a moving steel strip and to an arrangement for laser texturing a moving steel strip.

BACKGROUND OF THE INVENTION

In the finishing of (coated) steel strip, a steel strip is subjected to levelling and/or temper rolling. With levelling the shape and form of the strip are controlled and with temper rolling the mechanical properties of the steel strip are improved by lengthening of the strip and by orientation of the grains in the steel in the rolling direction. Also the surface quality of the strip is improved as far as it concerns appearance, surface texture and surface function(ality). With the temper rolling step a texture may be transferred to the surface of the strip from the work rolls to get a certain function, such as, but not limited to, appearance, a better adhesion of paint, tribological properties and improved forming properties of the steel strip. The texturing of the steel strip is done to the requirements of the end user, for instance end users in the automotive industry.

To apply a texture to a steel strip at least one of the temper work rolls in contact with the steel strip, is provided with a certain texture on the roll surface, such that an impression of which is transferred to the surface of the steel strip when passing through the temper mill. Since the texture on the texture transfer roll wears out, and/or becomes fouled, the required texture has to be renewed or applied again frequently. For the texturing of the texture transfer roll surface, various techniques are available but even with the more durable applied textures the major drawback is that they all have a certain but limited stand time. This has become an even larger drawback with the increasing application of high strength steels over a wide product range.

Another drawback is that for the application of different textures the texture transfer roll has to be changed resulting in time and hence production losses. Additionally, if different textures are required on the strip on different locations, either within the roll width, outside the length of the roll circumference, or on the top or bottom of the steel strip this cannot be achieved with conventional single stand rolling mills.

As an alternative the textures can be applied by means of laser texturing, wherein the textures are preferably applied in the steel strip while the steel strip is moved along the processing line. With laser texturing the texture is applied instead of impressing the texture in the steel strip by ablation of material from the steel strip. With the ablation of material from the steel strip it is necessary to remove the ablated material from the strip in order to keep the strip clean and therewith prevent disturbances in the texture to be applied because of the presence of ablated material on the surface of the steel strip.

OBJECTIVES OF THE INVENTION

It is an objective of the present invention to provide a method for laser texturing the surface of a steel strip moving at high speed.

It is an objective of the present invention to provide a method for laser texturing the surface of a moving steel strip wherein texturing debris is removed from the surface.

It is another objective of the present invention to provide a method for laser texturing the surface of a moving steel strip which provides a clean textured surface.

It is another objective of the present invention to provide a method for laser texturing the surface of a moving steel strip adapted for high throughput laser texturing.

It is another objective of the present invention to provide a method for laser texturing the surface of a moving steel strip which can be applied easily and against low costs.

It is another objective of the present invention to provide an arrangement to apply the method for laser texturing the surface of a moving steel strip which is suitable for industrial use.

DESCRIPTION OF THE INVENTION

According to a first aspect of the invention one or more of the objectives of the invention are realized by providing a method for the texturing of a moving steel strip wherein a texture is applied to a surface of a moving steel strip by ablation by means of a single laser beam or a plurality of laser beams directed at the surface of the moving steel strip, wherein a liquid is supplied on the moving steel strip over a surface area on the moving steel strip that covers the working area of the single laser beam or the plurality of laser beams on the moving steel strip.

The "working area" of the laser beam or laser beams will mean the area on the moving steel strip over which the laser beam or laser beams are controlled to work by means of the control of the laser beam or laser beams.

In order to be able to apply a texture pattern on a moving steel a laser beam or laser beams are used which can either be pulsed laser beams or continuous wave laser beams which modify the strip steel surface. In case a pulsed laser source is used, pulse durations in the nano-, pico or femto-second regime are preferably used, to obtain well defined textures in the micrometer range without that the rest of the strip or the coating is thermally affected or at least not significantly thermally affected.

The term "steel strip" shall mean "steel strip" as well as "coated steel strip".

The strip surface is textured using a non contact method which in this case is by means of electromagnetic radiation, more specifically by laser. Instead of laser texturing also other energy beams could be used for texturing, in particular by means of electron- or ion beams. With texturing by means of electron- or ion beams a vacuum is needed to apply a texture which requires additional measures in comparison with the method according to the invention.

A single laser beam is sufficient to apply a texture pattern on a moving steel strip, however if different texture patterns alongside of each other or when broad steel strips have to be provided with texture patterns it is advantageous to have more than a single laser beam available. To that end, the laser beams are divided in groups each with a single laser beam or a plurality of laser beams, which groups are controlled separately. With multiple laser beams it will be possible and/or easier to control the laser beams to provide a broad strip with a texture pattern or where different texture patterns have to be applied next to each other on a moving steel strip.

By providing a liquid on the moving steel strip over at least the working area of the laser beam or laser beams the material ablated from the moving steel strip by texturing will get suspended in the liquid. The advantage is that the ablated material is removed almost directly from the spot that is textured, resulting in a clean textured surface without that the ablated residue sticks to the steel strip nearby the textured spot. It was further found that because of the removal of the ablated material it is possible to apply the texture faster than would be possible without first applying a liquid on the surface of the moving steel strip.

In order to have the same conditions over the whole of the surface of the steel strip that should be provided with a texturing the liquid is provided over a width of the moving steel strip at least equal to the width of the surface area of the steel strip to which the texture is to be applied.

It was found that the ablation rate is dependent on the thickness in which the liquid is applied on the moving steel strip. In order to have sufficient effect the thickness of the layer of liquid not be lower than 0.1 mm. A workable maximum thickness is in the order of 10 mm. For that reason the method provides that the liquid is formed into a liquid film of predefined thickness. It was further found that the ablation rate is constant or as good as constant over a thickness of the liquid film in a range of 1-5 mm. This provides a further advantage that there is no need to adjust the thickness of the liquid film with thickness variations of different steel strips as long as these thickness variations are less than 4 mm. This will cover a large range of steel strips of different thickness.

According to a further aspect of the method according the invention it is provided that the thickness of the supplied liquid is controlled by guiding the liquid between the moving steel strip and guide means provided at a distance with respect of the surface of the moving steel strip. These guide means have a flat surface area extending over the working area of the laser beam or laser beams and are made of a material transparent for the laser light used. Hardened glass or a transparent plastic material are suitable guide means.

According to a further aspect of the invention it is provided that the distance between the guide means and the surface of the moving steel strip is controlled.

By controlling the thickness of the liquid film the guide means also prevents that any ripple is formed on the surface of the liquid film. This is important because even if the thickness of the liquid film with the ripple is within the range of 1-5 mm it will result in deviation of the laser beam because of varying refraction because of a varying incident angle with respect to the surface of the liquid film.

According to another embodiment of the invention the liquid is supplied by spraying and the layer thickness is controlled by controlling the spray volume in dependence of the velocity of the moving steel strip. Wherein the previous embodiment it is required to provide at least a sufficient quantity of liquid to fill the space between the moving steel strip and the guide means for the liquid, with this embodiment it is important not to provide too much liquid.

To that end the liquid is sprayed on the moving steel strip with a sufficient number of nozzles to evenly cover the area of the moving steel strip that has to be textured. If necessary it is further provided that the liquid is supplied on the moving steel strip in two or more stacked layers. By applying the liquid film with two or more series of nozzles in downstream direction a number of thin liquid film layers are stacked to get a thickness that is sufficient for the purpose. By spraying in one or more thin layers the liquid will be distributed evenly over a surface area of the moving steel strip and will result in a thickness that is sufficiently constant over the working area of the laser beam or laser beams.

The thickness of the liquid film applied by spraying is less than that of the liquid film of 1-5 mm as preferably applied between a moving steel strip and the guide means of the previous embodiment. It was found that a workable thickness range of the liquid film is in the range of the critical minimum thickness of 0.1 mm and the start thickness of the range as used in the previous embodiment. It was found that a preferable thickness range for a sprayed liquid film is in the order of 0.5-1 mm.

According to yet another embodiment of the invention the moving steel strip is guided through a container with liquid and wherein focussing optics of the single laser beam or the plurality of laser beams are submerged in the liquid at a predefined distance of the surface of the moving steel strip. The container used in this embodiment is for example a closed container with an entry and exit slot for the moving steel strip, wherein the slots are designed to prevent that liquid or too much liquid is lost from the container. An alternative is to use a container with an open topside wherein the steel strip is guided through the container by means of guide rolls.

The advantage of using a container with a liquid is that the focussing optics of the laser beam or beams are submerged in the liquid avoiding therewith the refraction that would otherwise occur with the use of an intermediate transparent plate or the like as described above.

The method according the invention is adapted to high throughput line speeds. In the method according the invention the line speed of the moving steel strip is in the range of 0.5 m/s up to and including 15 m/s, preferably in the range 1 to 5 m/s.

According to a further aspect of the invention it is provided that the single laser beam or the plurality of laser beams are pulsed laser beams, wherein
the pulse duration is in the range of 1 fs to 100 ms,
the electromagnetic radiation of each laser beam has a wave length between 200 nm-11 μm, and
with an energy density of each laser beam in the range of 1 $nJ/cm^2$-100 $J/cm^2$, and preferably in the range of 0.1 $J/cm^2$ to 10 $J/cm^2$.

According to a further aspect of the invention an arrangement is provided to apply a texture to a surface of a moving steel strip by ablation comprising a single laser beam or a plurality of laser beams directed at the surface of the moving steel strip, control means to control the single laser beam or plurality of laser beams to apply a texture on the moving steel strip and liquid supply means to supply a liquid on the surface of the moving steel strip where the texture is to be applied.

In this arrangement the liquid supply means comprise one or more nozzles to supply the liquid across the width of the surface area of the moving steel strip where the texture is to be applied.

According to a further aspect of the invention guide means are provided parallel to the path of the moving steel strip and downstream of the liquid supply means to guide the liquid over the surface of the moving steel strip.

The number of nozzles or the supply rate of the nozzles is further determined by the thickness of the required liquid film and the line speed of the moving steel strip. Since the liquid is not enclosed by the guide means the liquid will pass the guide means at least at the downstream side thereof and has to be supplied continuously in excess of the volume of liquid required between the guide means and the moving steel strip.

Preferably the liquid is supplied through the nozzles in the direction of movement of the moving steel strip so that the liquid is easily guided between the steel strip and the guide means. To this end it is further provided that the guide means has at the upstream side an upward directed edge by means of which an initial liquid layer of larger thickness is forced by the movement of the steel strip in the space between guide means and the moving steel strip defining a smaller volume. The upward directed edge has the advantage that a sufficient amount and an even distribution of the liquid is obtained between the guide means and the moving steel strip.

According to a further aspect of the invention an arrangement is provided to apply a texture to a surface of a moving steel strip by ablation comprising a single laser beam or a plurality of laser beams directed at the surface of the moving steel strip, control means to control the single laser beam or plurality of laser beams to apply a texture on the moving steel strip, a container with a liquid, wherein the focussing optics of the single laser beam or the plurality of laser beams are submerged in the liquid at a predefined distance with respect of the path of the moving steel strip.

BRIEF DESCRIPTION OF THE DRAWINGS

The invention will be further explained on hand of the example shown in the drawing, in which.

DETAILED DESCRIPTION OF THE DRAWINGS

Figure 1:
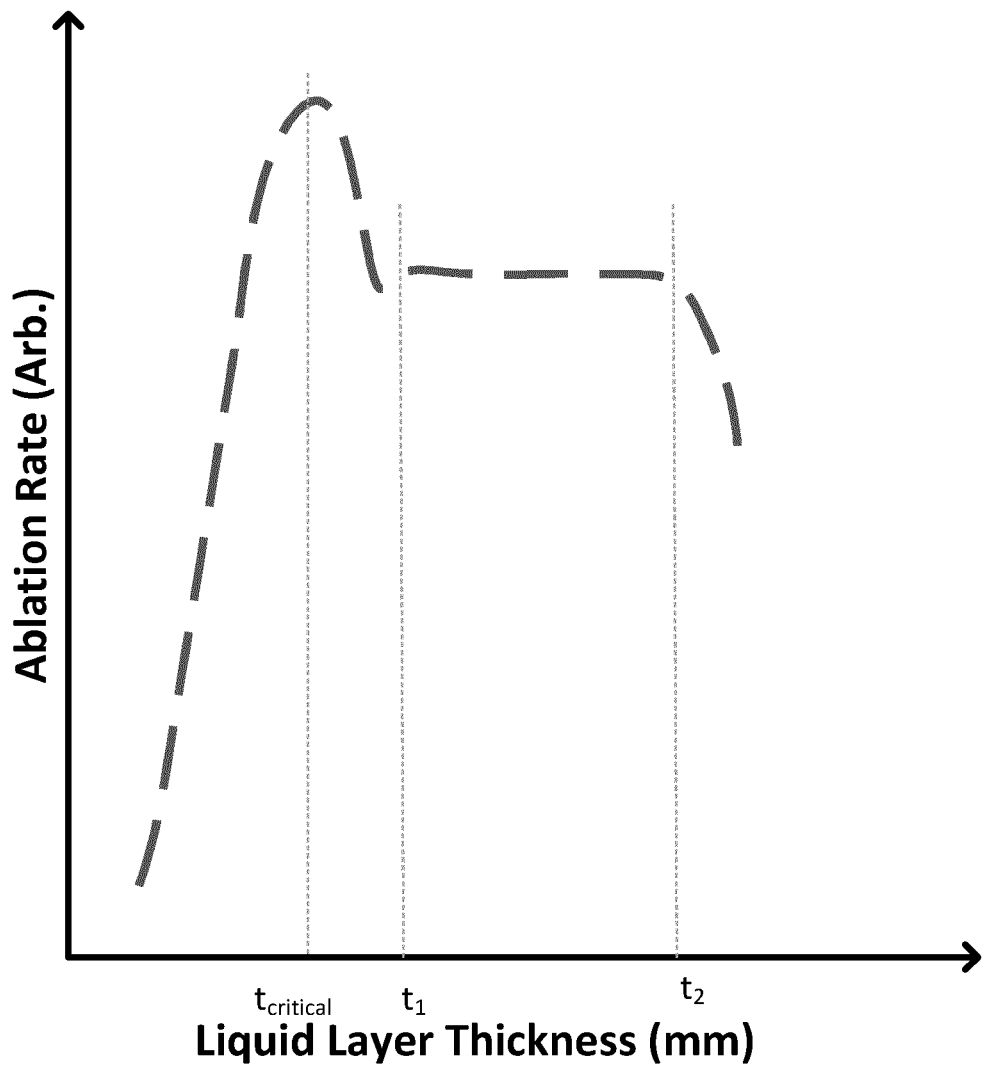
FIG. 1 shows a diagram with the thickness of the liquid film in relation to the ablation rate.

In FIG. 1 a diagram is shown with the ablation rate as a function of liquid layer or liquid film thickness. A liquid film must have a thickness above a critical value $t_{critical}$ and below t2 to ensure optimal material removal. In practice, the values t1 and t2 are between 0.5 mm and 10 mm. Preferably the thickness of the liquid film is kept in a more limited range from 1 mm up to and including 5 mm which creates a much more stable focus regime for the laser beam or laser beams.

Figure 2:
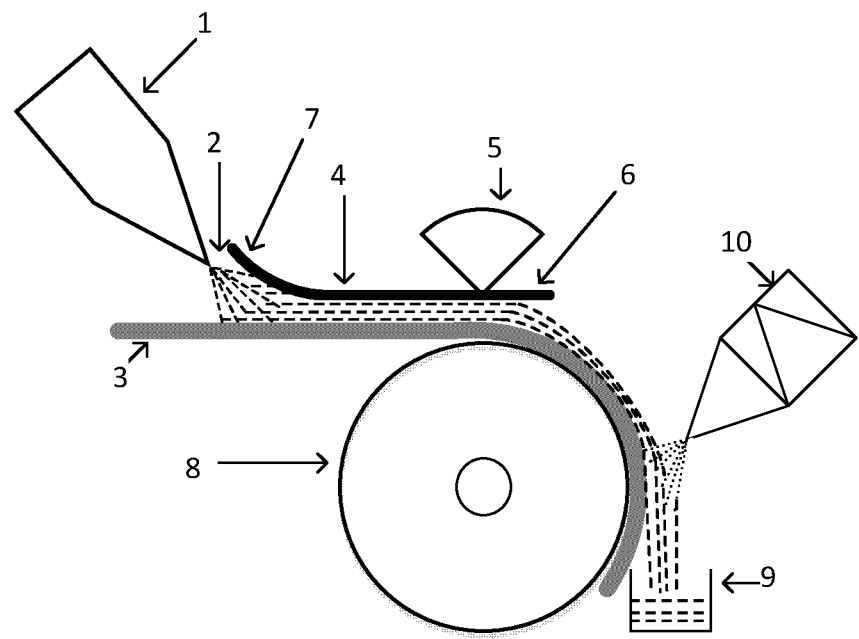
FIG. 2 shows schematically an arrangement with supply nozzles to supply a liquid on a moving steel strip, a laser device and guide means to guide the liquid over the steel strip.
Figure 3:
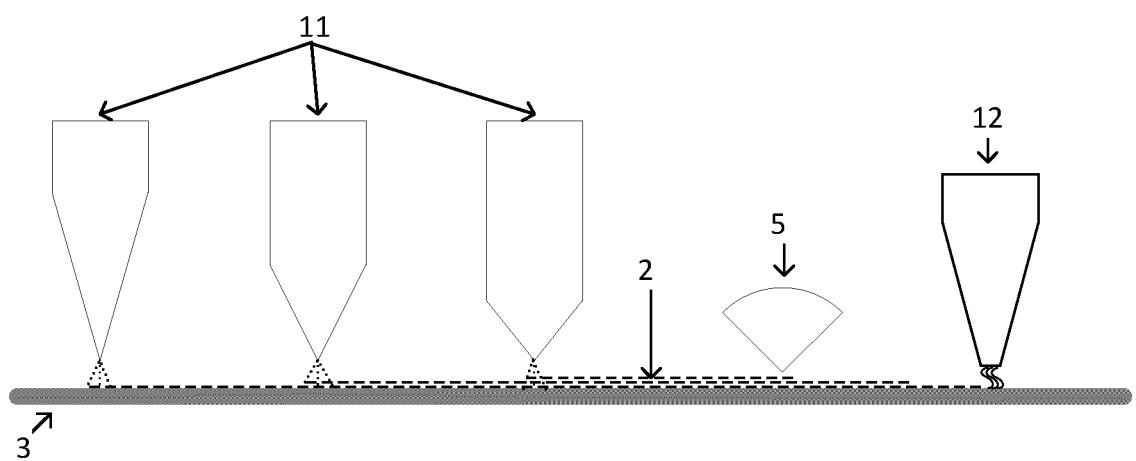
FIG. 3 shows schematically an arrangement with spray nozzles to spray a liquid film on a moving steel strip, a laser device and cleaning nozzles.
Figure 4:
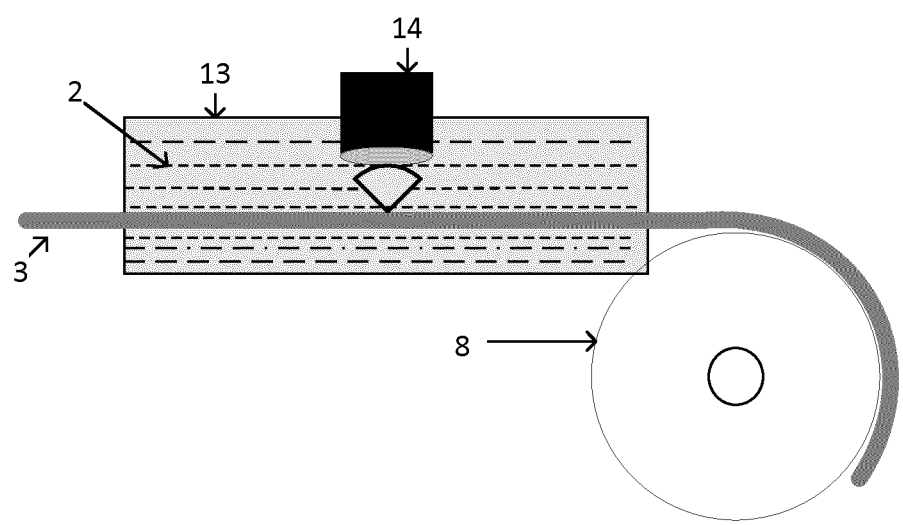
FIG. 4 shows schematically an arrangement with a container filled with a liquid through which a steel strip is moved and a laser device projecting into the container.

In the schematic FIGS. 2, 3 and 4, the strip is processed from left to right.

FIG. 2 shows schematically a set-up with one or more supply nozzles 1 supplying a liquid 2 on a moving steel strip 3, wherein guide means 4 are provided to guide and/or force the supplied liquid 2 into a liquid film of a predefined thickness between strip 3 and guide means 4. Directly above the guide means a laser device 5 is mounted providing one or more laser beams to apply a texture on the moving steel strip 3.

The guide means comprise a flat portion 6 of a transparent material which has low to negligible refraction for the incoming laser light. For the transparent material glass or hardened glass could be used which should preferably be of high quality with no internal defects. The glass itself can also be textured to alleviate turbulent flow at the water/glass interface. The contact side of the glass surface may be hydrophobic in character to prevent turbulent flow being introduced through the liquid adhesion to the contact surface. If required, the glass surface can be made hydrophobic in a wide variety of ways including surface texturing by laser, etching, lithography, selective deposition or by chemical modification through surfactants.

The distance between the flat portion of the guide means and the surface of the moving steel strip is within tens of millimetres, and preferably between 1 and 5 millimetres.

Control means (not shown in the drawing) are provided for the adjustment of the distance between the guide means and the moving steel strip and to keep the guide means within a predefined distance range above the moving steel strip. The predefined distance can be controlled for instance by jacks, motors, or a pulley system.

Further means are provided to measure the distance between the guide means and the moving steel strip (also not shown in the drawing) which is used in the distance control of the guide means. Such means could for instance be based on ultrasound distance measurements, but of course many alternatives exists that could be used for the measurement of said distance.

The guide means are provided with an upward directed edge 7 connected to the flat portion 6 of the guide means. The declining slope of the edge 7 guides the supplied liquid under the flat portion 6 of the guide means and ensures a conical flow of liquid from the nozzle or nozzles 1 to the working area of laser device 5 below flat portion 6.

It is important to prevent that the liquid film affects the steel strip surface in any way. In many cases water can be used without that the steel strip, for instance galvanised steel strip, is affected in any way. If necessary demi-water or other liquids can be used, or liquids with additives for instance water or demi-water with alcohol, ammonia (up to 5%) and the like. An important requirement is that the liquid or the liquid with additives has negligible effect on the refraction of the incoming laser light.

A support roll 8 is provided for the steel strip guiding the steel strip 3 in a downward direction. With this configuration the used liquid can easily be collected downstream of the guide means 4. A cleaning nozzle 10 is provided to remove texturing debris from the steel strip with a cleaning liquid. A collection container 9 is provided to collect the used liquid and the texturing debris.

The configuration as shown in FIG. 2 can also be used at an angle up to and including a vertical position.

As an alternative the guide means as described above could be replaced by a knife device which defines a passageway with respect to the moving steel strip, wherein the width of the passageway is a key factor in the thickness of the liquid film downstream of the knife device. With such a knife device there is no need for a transparent plate or the like, but the thickness of the liquid film can not be controlled as well as with the embodiment according to FIG. 2 and ripples and or waves on the surface of the liquid can not be prevented. Such a knife device can also be used at an angle up to and including a vertical position.

In the configuration shown in FIG. 3 spray nozzles 11 are used to spray a liquid film on moving steel strip 3. The thickness of the liquid film is controlled by the pressure of the spray system and size(s) of the spray nozzle or nozzles 11, in combination with the line speed of the steel strip. The created layer thickness is in the range of sub-millimeters, preferably in the range $t_{critical}$ to t1, see FIG. 1, which is in the range of about 0.1-0.5 mm.

In FIG. 3 a number of successive spray nozzles are shown, where each of the shown spray nozzles 11 may in fact be a series of spray nozzles divided over the width or part of the width of the steel strip. With the successive spray nozzles 11 a number of thin layers of sprayed liquid are stacked to get a thickness within the range of about 0.1-0.5 mm. In this embodiment the adhesion between the steel strip and the liquid film with limited thickness is the essential factor in providing a largely constant thickness of the liquid film.

Within this thickness range of the liquid film the ablation rate is not as constant as with a thicker liquid film but is nevertheless within a certain range, see FIG. 1, which will result in a texturing of the steel strip that will be sufficient for many applications.

The applied liquid film will be evaporated and/or reduced at least partly within the working area of the laser device 5. Downstream of the working area of laser device 5 a hot air device 12 is mounted with which hot air is blown on the moving steel strip. With the hot air the remaining part of the liquid film is dried out and dust resulting from the ablation by the laser beam or beams is blown away from the finished surface of the steel strip.

During laser processing under water film, the ablation of strip material is accompanied by the formation of bubbles, as well as a cavitation. The cavitation bubble(s) decay in a time $t_x$, during which laser processing is not desirable in the same location. In addition, bubbles might stick to the window, flat portion 6 and negatively affect the laser beam. To ensure that bubbles generated by the process escape efficiently from the laser-material interaction zone and do not stick to the window 6, the set-ups as depicted in FIG. 2 and FIG. 4 could be rotated around the axis of the support roll at any angle. Preferably the chosen angle is counter clockwise around the axis of the support roll at any angle in the set-ups as depicted in FIG. 2 and FIG. 3.

In the embodiment shown in FIG. 4 a container 13 is provided filled with a liquid, wherein the container is provided with a watertight entry slot and exit slot for the moving steel strip 3 passing through the liquid 2 in the container. Laser beam focusing optics 14 are submerged in the liquid 2 in container 13. The distance between the focusing optics 14 and the steel strip surface determines the focal length of the laser beam. Since the laser beam optics 14 and the steel strip 3 are in same medium, a wavy nature of the liquid surface does not play any role in the texturing of the steel strip.

This embodiment with the focusing optics 14 submerged in the liquid reduces the texturing process from a two medium processing system as in the embodiments according to FIG. 2 and FIG. 3 respectively, to a single medium processing system, thus eliminating the need of liquid layer surface variation control.

The container is further provided with an inlet and outlet port to change and/or replenish the liquid 2 in container 13, which could be done either continuously or intermittently. Temperature control means, comprising heater and/or cooler devices, are provided to keep the liquid within a predefined temperature range.

Instead of a container 13 with watertight entry slot and exit slot for the moving steel strip 3 a container with an at least partly open topside can be used. In such a configuration a number of guide rolls are needed to guide the steel strip into the container, through the liquid in the container, out of the container and back again in the overall direction of the processing line.

The liquid is the key component in all set-ups. The liquid may comprise solvent with additives resulting in a desired dynamic viscosity in the range of 0.01-1000 mPa·s, preferably in the range 5-500 mPa·s, more preferably in the range 50-250 mPa·s and even more preferably in the range 75-125 mPa·s and has negligible refractive index contribution in the beam path of the used laser light of wavelength (200 nm-11 μm) in a temperature range of 5-50° C.

The invention claimed is:

1. A method for the texturing of a moving steel strip,
   wherein a texture is applied to a surface of a moving steel strip by ablation of the surface of the moving steel strip by a single laser beam or a plurality of laser beams directed at the surface of the moving steel strip to contact the surface of the moving steel strip,
   the method comprising supplying a liquid on the moving steel strip over a surface area on the moving steel strip that covers the working area of the single laser beam or the plurality of laser beams on the moving steel strip,
   wherein the liquid is supplied by spraying, wherein the layer thickness of the liquid is controlled by controlling the spray volume in dependence of the velocity of the moving steel strip.

2. The method according to claim 1, wherein the supplied liquid is formed into a predefined thickness of a liquid film.

3. The method according to claim 1, wherein the thickness of the supplied liquid is controlled by guiding the liquid between the moving steel strip and guide means provided at a distance with respect of the surface of the moving steel strip.

4. The method according to claim 3, wherein the distance between the guide means and the surface of the moving steel strip is controlled.

5. The method according to claim 1, wherein the liquid is supplied on the moving steel strip in two or more stacked layers.

6. The method according to claim 1, wherein the thickness of the liquid film is in the range of 0.1 mm to 10 mm.

7. The method according to claim 1, wherein the line speed of the moving steel strip is in the range of 0.5 m/s to 15 m/s.

8. The method according to claim 1,
   wherein the single laser beam is a pulsed laser beam, wherein
      the pulse duration is in the range of 1 fs to 100 ms,
      the electromagnetic radiation of the laser beam has a wavelength between 200 nm and 11 μm, and
      with an energy density of the laser beam in the range of 1 nJ/cm$^2$ to 100 J/cm$^2$.

9. The method according to claim 1, wherein the line speed of the moving steel strip is in the range of 1 m/s to 5 m/s.

10. The method according to claim 1, wherein the plurality of laser beams are pulsed laser beams, wherein
    the pulse durations are in the range of 1 fs to 100 ms,
    the electromagnetic radiation of each laser beam has a wavelength between 200 nm and 11 μm, and
    with an energy density of each laser beam in the range of 0.1 J/cm$^2$ to 10 J/cm$^2$.

11. The method according to claim 1, wherein the single laser beam or the plurality of laser beams are directed downwardly at the surface of the moving steel strip.

12. The method according to claim 1, wherein the thickness of the supplied liquid is controlled by guiding the liquid between the moving steel strip and guide means provided at a distance with respect of the surface of the moving steel strip,
wherein the guide means has an upward directed edge connected to a flat portion to define a declining slope to guide the liquid under the flat portion and the guide means is of transparent material.

13. A method for the texturing of a moving steel strip wherein a texture is applied to a surface of a moving steel strip by ablation by a single laser beam or a plurality of laser beams directed at the surface of the moving steel strip, the method comprising supplying a liquid on the moving steel strip over a surface area on the moving steel strip that covers the working area of the single laser beam or the plurality of laser beams on the moving steel strip,
wherein the moving steel strip is guided through a container with the liquid and wherein focusing optics of the single laser beam or the plurality of laser beams are submerged in the liquid at a predefined distance of the surface of the moving steel strip.

14. A method for the texturing of a moving steel strip, wherein a texture is applied to a surface of a moving steel strip by ablation of the surface of the moving steel strip by a single laser beam directed at the surface of the moving steel strip to contact the surface of the moving steel strip,
the method comprising supplying a liquid on the moving steel strip over a surface area on the moving steel strip that covers the working area of the single laser beam on the moving steel strip,
wherein the liquid is supplied by spraying;
wherein the single laser beam is a pulsed laser beam, wherein
the pulse duration is in the range of 1 fs to 100 ms,
the electromagnetic radiation of the laser beam has a wavelength between 200 nm and 11 μm, and
with an energy density of the laser beam in the range of 1 nJ/cm$^2$ to 100 J/cm$^2$.

15. The method of claim 1, wherein a liquid supply means supplies the liquid on the surface of the moving steel strip where the texture is to be applied.

16. The method according to claim 15, wherein the liquid supply means comprise one or more nozzles supplying the liquid across the width of the surface area of the moving steel strip where the texture is to be applied.

17. The method according to claim 15, wherein guide means are provided parallel to a path of the moving steel strip and downstream of the liquid supply means to guide the liquid over the surface of the moving steel strip.

18. The method according to claim 17, wherein distance between the guide means and the path of the moving steel strip is in a range of 1 mm to 5 mm.

19. The method according to claim 17, wherein the guide means comprise a transparent plate.

20. The method according to claim 19, wherein the transparent plate has at the upstream side an upward directed edge.

* * * * *